Figure 1:
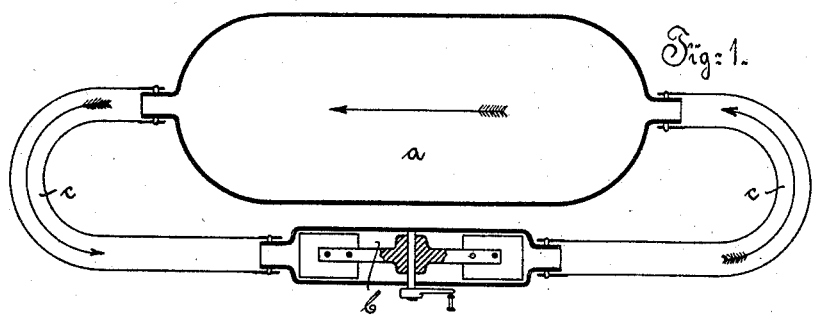

No. 722,232. PATENTED MAR. 10, 1903.
H. HOEGLAUER.
BATH TUB.
APPLICATION FILED APR. 12, 1902.
NO MODEL. 3 SHEETS—SHEET 1.

Attest:
Anton Glochner
F. H. Schott

Inventor:
Heinrich Hoeglauer,
by Max Smois
his attorney

No. 722,232. PATENTED MAR. 10, 1903.
H. HOEGLAUER.
BATH TUB.
APPLICATION FILED APR. 12, 1902.
NO MODEL. 3 SHEETS—SHEET 2.
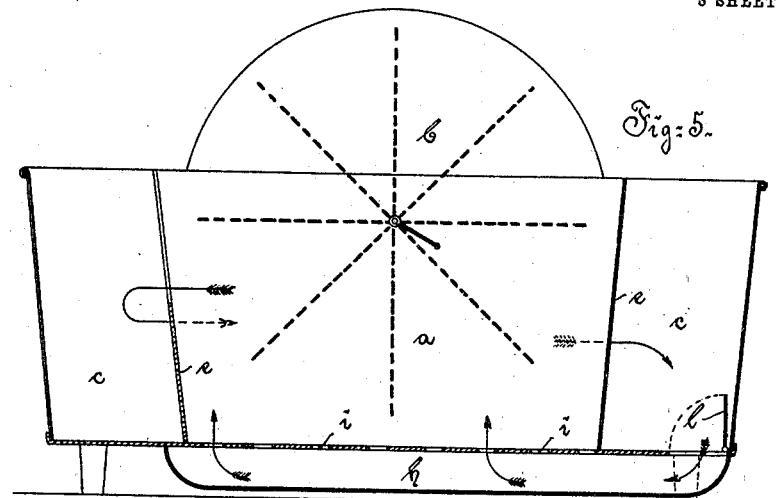
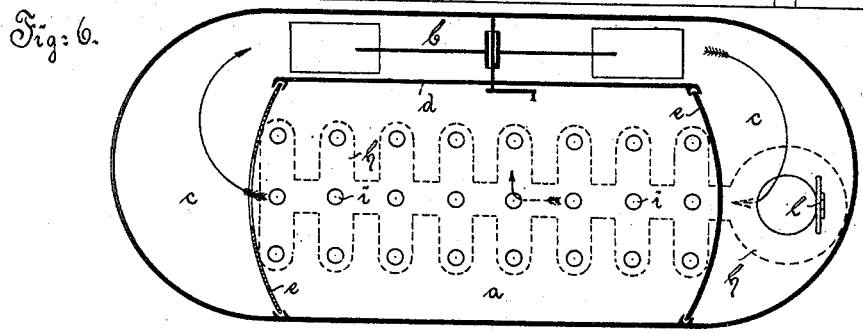
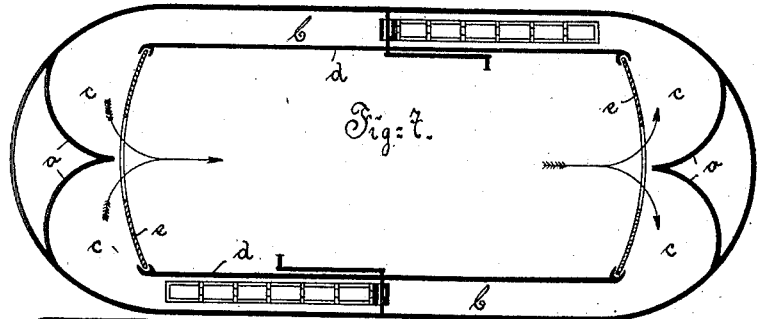
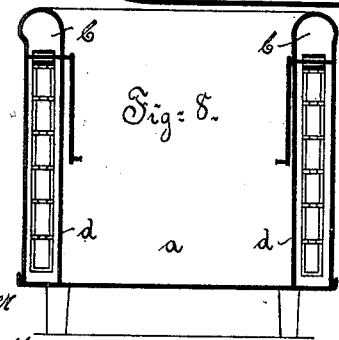
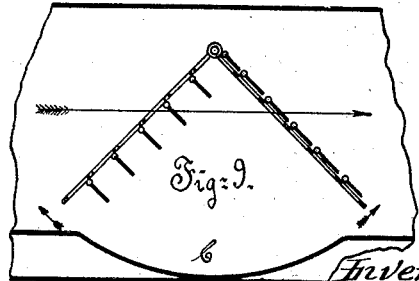
Attest:
A. Gloetzner
F. H. Schott
Inventor:
Heinrich Hoeglauer No. 722,232. PATENTED MAR. 10, 1903.
H. HOEGLAUER.
BATH TUB.
APPLICATION FILED APR. 12, 1902.
NO MODEL. 3 SHEETS—SHEET 3.

Attest:
Anton Gloetzner
F. H. Schott

Inventor:
Heinrich Hoeglauer,
by Max Pirgü
his Attorney.

ions.  Several of these various modifications
UNITED STATES PATENT OFFICE.

HEINRICH HOEGLAUER, OF MUNICH, GERMANY.

BATH-TUB.

SPECIFICATION forming part of Letters Patent No. 722,232, dated March 10, 1903.

Application filed April 12, 1902. Serial No. 102,619. (No model.)

*To all whom it may concern:*

Be it known that I, HEINRICH HOEGLAUER, a citizen of Bavaria, residing at Munich, Germany, have invented certain new and useful Improvements in Bath-Tubs; and I do hereby declare the following to be a full, clear, and exact description of the invention, such as will enable others skilled in the art to which it appertains to make and use the same.

My invention relates to improvements in bath-tubs.

The object of my invention is to provide a bath-tub by means of which the effects of a river, spring, or sea bath—that is to say, the effect of any sort of water-massage—may be obtained with a limited quantity of water.

My invention consists in providing a bath-tub with means whereby strong currents of water, waves, waterfalls, and the like may be obtained.

More specifically considered, my invention consists in combining a fixed or stationary tub with a water circulating or moving apparatus—for example, a water-wheel, turbine, pump, paddle mechanism, chain-pump mechanism, or swinging-shutter work. By setting in operation the water-moving apparatus the water located in the tub can be caused to circulate in a horizontal or vertical direction or may be given a wave motion. The water-moving apparatus may be arranged to be operated by hand by the bather, by another person, or may be driven through suitable motive power. Furthermore, it may stand independently alongside the tub, being united either permanently or detachably with such tub through any desired channels, such as tubes or pipes, or the said water-moving apparatus may be placed in direct combination with the tub or can be inserted directly in the tub in any suitable part of the same either at a head or foot end or at one or both sides. Moreover, special channels may be provided with a circulation of the water or the water-moving apparatus may be arranged in a suitable chamber or space separated from the bathing-chamber by means of simple partitions. Several of these various modifications of my invention are illustrated in the accompanying drawings, in which—

Figure 2:
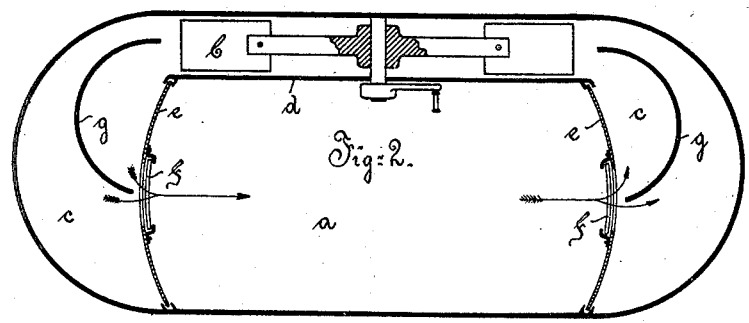
Figure 3:
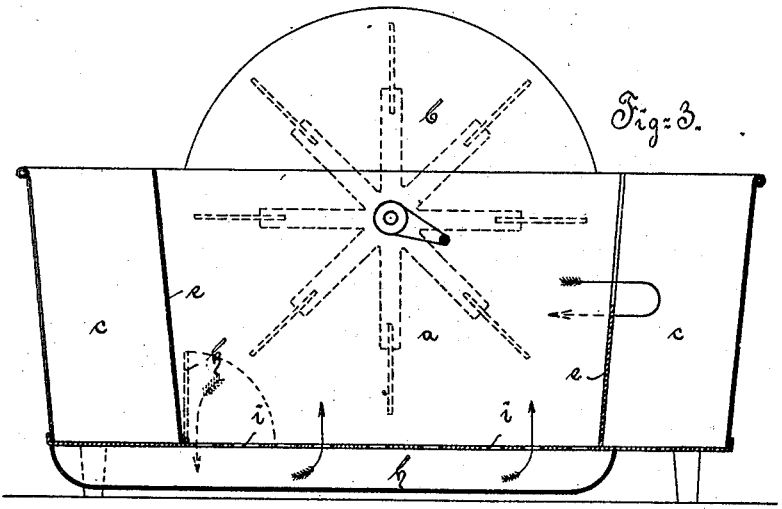
Figure 10:
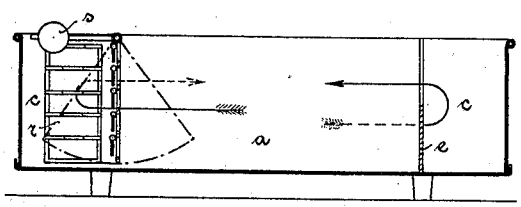
Figure 11:
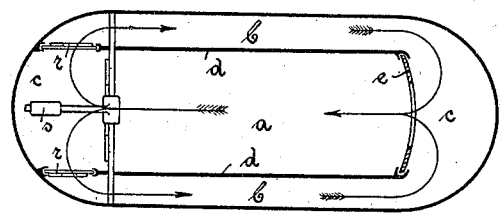
Figure 12:
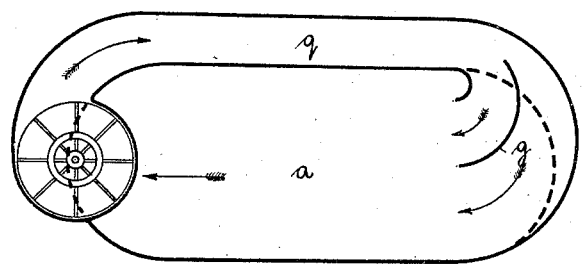
Figure 13:
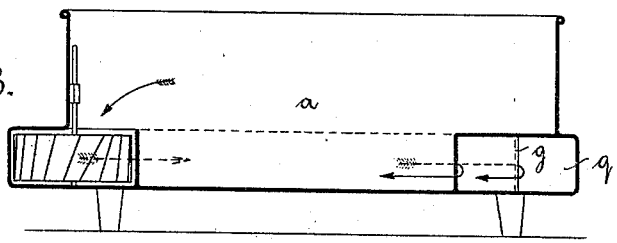
Figure 14:
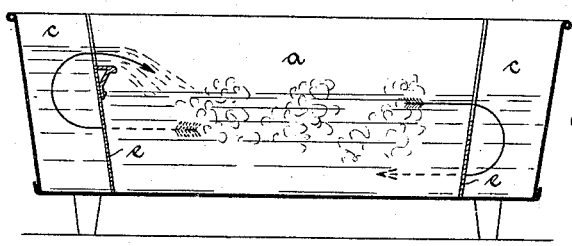
Figure 15:
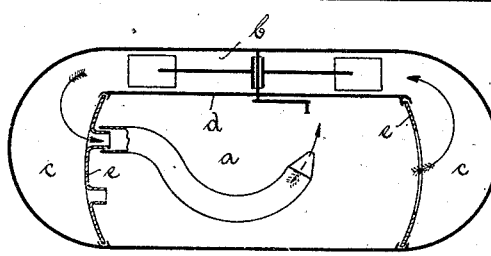

Figure 1 is a sectional plan view showing a tub with a separate or independent water-moving apparatus, in this case a water-wheel connected to the tub by detachable channels or conductors. Fig. 2 is a similar view showing a water-wheel arranged in the tub. Fig. 3 is a vertical section; and Fig. 4, a sectional plan view of another modification of my invention, in which a vertical movement of the water is obtained. Figs. 5 and 6 are views similar to Figs. 3 and 4, respectively, showing a still further modification of my invention by means of which a vertical movement of the water is obtained. Fig. 7 is a sectional plan view of a further modification, showing two water-moving paddles arranged one at each side of the tub. Fig. 8 is a cross-section of Fig. 7, and Fig. 9 a detail view of one of the paddle devices. Figs. 10 and 11 are a vertical section and sectional plan view, respectively, of a modification of my invention, in which the water-moving apparatus consists of one swinging shutter arranged at the foot of the tub. Figs. 12 and 13 are a sectional plan view and a vertical section, respectively, of a tub in combination with a turbine, illustrating another embodiment of my invention. Fig. 14 is a vertical sectional view illustrating a tub by means of which a waterfall effect may be obtained, while Fig. 15 is a sectional plan view showing a tub with a flexible conductor whereby a water-massage effect may be obtained upon any desired spot of the bather.

In Fig. 1, *a* is the bathing-compartment, which is detachably connected with the machine-compartment *b*, in which the water-moving apparatus is located, this connection being made by inflow and outflow conductors *c*, detachably connected by bayonet-joints.

In Fig. 2 the water-moving apparatus is arranged in the tub itself at one side in the machine-compartment *b*, which is separated from the bathing-compartment *a* by a partition-wall *d*. Furthermore, right and left hand channels *c* are closed off from the bathing-compartment by division-walls *e*, which may travel in grooves, as shown, in order to permit their ready removal and may be provided with suitable water passages or openings, which may be closed by slides *f*. In the channels *c* may be inserted arc-shaped partition-walls *g*, which insure a uniform and better-divided flow of the water to and fro. In this embodiment of my invention the flow of the water is horizontal, the direction of the flow being determined by the direction of the rotation of the water-wheel, which, it is obvious, may be turned in either direction.

Figure 4:
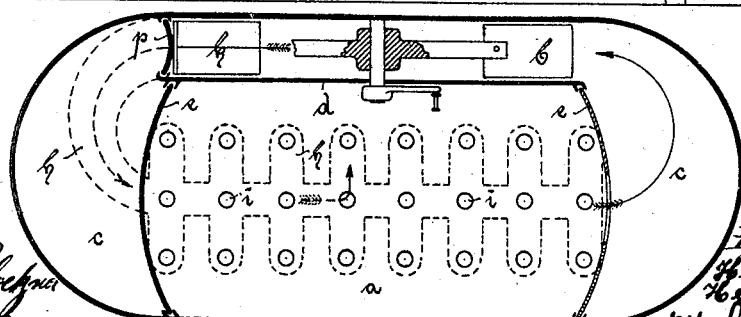

In Figs. 3 and 4, $a$ is the bathing-compartment, and $b$ the machine-compartment, the two compartments being separated by the partition $d$. Suitable channels $c$ are closed off by means of the removable walls $e$, as shown. Under the tub is arranged a channel $h$, which is in communication with the bathing-compartment through holes $i$ in the bottom of such compartment. In the bottom of the machine-compartment $b$ is an opening connecting with the channel $h$ and arranged to be closed by a shutter or flap $k$. A removable division-wall $p$, located adjacent to the flap $k$, effectually separates the machine-compartment $b$ from the left-hand channel $c$. The right-hand removable wall $e$ is provided with an opening leading into the right-hand channel $c$, thus putting the bathing-compartment in communication with the machine-compartment through said right-hand channel $c$. The bathing-compartment, furthermore, is closed from the left-hand channel $c$ by the left-hand wall $e$. If now the flap $k$ is opened, the water is thrown by the force of the water-wheel from the machine-compartment through the opening beneath the flap $k$ and into the under channel $h$, from whence it rises vertically through the holes $i$ into the bathing-compartment $a$ and leaves the latter through the opening in the right-hand wall $e$, finally returning to the machine-compartment through the right-hand channel $c$. In this way a vertical movement of the water in the bathing-compartment is readily obtained, thus giving an effect similar to that obtained in spring-baths. A vertical movement of the water may also be obtained by the construction shown in Figs. 5 and 6, in which the right-hand channel $c$ is separated from the bathing-compartment by the division-wall $e$, an opening being provided at the bottom of said channel and arranged to be closed by a flap $l$, as shown. In this construction the water coming from the machine-compartment $b$ enters the right-hand channel $c$, flows through the opening in the bottom of said channel, thence through the under channel $h$, and from thence rises vertically through the openings $i$ into the bathing-compartment, finally flowing through an exit-opening in the left-hand wall $e$ back to the machine-compartment through the left-hand channel $c$.

Fig. 7 shows a tub which has two water-moving devices consisting of paddles mounted one on each longitudinal side of the tub each in a machine-compartment $b$, which compartments are separated by division-walls $d$ from the bathing-compartment $a$. The right and left channels $c$ are separated from the bathing-compartment by division-walls $e$, having suitable openings for the passage of the water. In the channel $c$ are located suitable deflectors or aprons $o$, whereby a better circulation and a more nearly uniform division of the water may be obtained.

In Figs. 7, 8, 9, 10, and 11 it will be noted that the water-moving apparatus consists of suitable paddles or swinging-shutter mechanism. The paddles in Figs. 7 to 9 are intended to be set in motion by hand by means of cranks, as will be clear particularly from Fig. 8.

Figs. 10 and 11 show a paddle mechanism arranged to be operated, preferably, by the feet of the bather, the said paddle mechanism having suitable shutter-valves $r$, opening to allow the passage of the water in one direction, but closing to prevent such passage of the water when the paddle is moved in the opposite direction. A weight $s$ is provided whereby the paddle is returned to its normal vertical position when moved away therefrom. It is intended that the feet of the bather shall operate this device by pressing the lower end of the paddle outward, the weight $s$ moving it in the opposite direction. The weight $s$ can be replaced by any other suitable pressure device or by a draft apparatus, such as a cord, to be operated by the bather.

If instead of the above-described apparatus the movement of the water is to be obtained by the employment of a turbine, then the turbine-compartment can be extended outside the confines of the tub proper, as shown in Figs. 12 and 13. The water can be thrown into the bathing-compartment either directly from the turbine-compartment and then returned to the latter through a channel or led from the turbine-compartment to the bathing-compartment through a channel $q$ and then permitted to flow back directly from the bathing-compartment to the turbine-compartment, as shown in Figs. 12 and 13. The channel $q$, shown in the drawings at one side of the bathing-compartment, can also be arranged beneath the latter, and thus may be used for the production of a vertical current in a manner analogous to the construction shown in Figs. 3 to 5. Instead of the turbine or paddles a vertical or a horizontal pump may also be employed. Moreover, by the introduction of a partition with an overflow-opening, as shown in Fig. 14 at the left-hand end, the horizontal movement of the water can be forced to assume the character of a waterfall. Furthermore, as shown in Fig. 15, tubes or pipes may be supplied at any desired point for producing a water-massage effect at any desired point of the body of the bather.

In the claims by the use of the term "mechanical means" I intend to include means operating by the direct employment of machinery—as, for instance, such mechanism as a wheel, a pump, or a screw—as distinguished from a jet of steam, water, or air producing induced currents.

By the insertion of suitably-shaped deflectors in the channels—such, for example, as shown at *g* in Figs. 2 and 12 and at *o* in Fig. 7—or by the use of removable partitions *e* in Fig. 2 or, furthermore, by the employment of different forms of water openings or passages in the partition-walls, as well as by the introduction of air, gases, and steam under the tub or to the bottom of the tub and then upward into the bathing-space the movement of the water can be varied in different manners and in particular a bubbling or spouting movement may be produced. A uniform wave-stroke similar to the waves of the ocean may be obtained if the water-wheel or other water-moving apparatus is moved to and fro in a pendulum-like manner with a gradual increase of oscillation corresponding to the rhythm of the resulting waves. In order to produce this result with a construction such as shown in Figs. 7, 8, and 9, the flaps or shutters must be arranged to be closed to prevent the water from opening them when they are moving in opposition to the same.

Having thus fully described my invention, what I claim as new, and desire to secure by Letters Patent of the United States, is—

1. A bath-tub comprising a bathing-compartment and in combination therewith another compartment containing mechanical means for effecting propulsion of water, and a channel connecting the two compartments, whereby a positive movement of the water into and out of the bathing-compartment may be effected.

2. A bath-tub comprising a bathing-compartment and in combination therewith another compartment containing a water-impelling wheel for effecting propulsion of water, and a channel connecting the two compartments, whereby a positive movement of the water into and out of the bathing-compartment may be effected.

3. A bath-tub comprising a bathing-compartment and in combination therewith another compartment containing mechanical means for effecting propulsion of water, a channel leading from the last-named compartment and communicating with the bottom of the first compartment, and a return-passage between the two compartments, whereby a positive circulation of the water between the two compartments may be effected.

4. A bath-tub having vertical partitions forming compartments and channels connecting the same, an agitator in one compartment adapted to move the water bodily through the channels and the other compartment, and deflectors in the channels.

5. The combination, with a bath-tub, removable vertical partitions located therein, whereby compartments are formed in the tub, one of the partitions having openings for the inflow of water, of means located in one of the compartments for causing a flow of water through said opening in the partition and thence through another compartment.

In testimony whereof I affix my signature in presence of two witnesses.

HEINRICH HOEGLAUER.

Witnesses:
H. R. McGINNIS,
JAMES L. A. BURRELL.